United States Patent [19]

Mukoh et al.

[11] 4,125,701

[45] Nov. 14, 1978

[54] ORGANIC PHOTOCONDUCTIVE MATERIALS

[75] Inventors: Akio Mukoh; Yasuki Mori; Hirosada Morishita, all of Hitachi, Japan

[73] Assignee: Hitachi, Ltd., Japan

[21] Appl. No.: 704,964

[22] Filed: Jul. 13, 1976

[30] Foreign Application Priority Data

Jul. 19, 1975 [JP] Japan .................................. 50-87852

[51] Int. Cl.² ........................ C08F 26/06; C08F 26/12; C08F 10/00

[52] U.S. Cl. .................................. 526/259; 96/1.5 R; 96/1.6; 526/263; 526/273; 526/284

[58] Field of Search ............... 526/259, 284, 273, 317, 526/320, 328

[56] References Cited

U.S. PATENT DOCUMENTS

| | | | |
|---|---|---|---|
| 2,072,465 | 3/1937 | Reppe et al. | 526/259 |
| 3,169,060 | 2/1965 | Hoegl | 526/284 |
| 3,464,819 | 9/1969 | Inami et al. | 526/284 |
| 3,705,031 | 12/1972 | Kinjo et al. | 526/259 |
| 3,764,590 | 10/1973 | Mukoh et al. | 526/259 |
| 3,923,762 | 12/1975 | Stolka et al. | 526/284 |
| 3,926,629 | 12/1975 | Weigl | 526/284 |
| 3,978,029 | 8/1976 | Limburg | 526/284 |
| 4,005,059 | 1/1977 | Chapiro et al. | 526/259 |

OTHER PUBLICATIONS

Chernobai et al., Chem. Abs. 63 (1965), pp. 10080h-10081b.

Rohm & Haas Co., Chem. Abs. 61 (1964), p. 5908c.

Cassiers et al., Chem. Abs. 62 (1965), p. 9980f.

Chem. Abs., 67 (1967), p. 65027s.

*Primary Examiner*—Harry Wong, Jr.

*Attorney, Agent, or Firm*—Craig & Antonelli

[57] ABSTRACT

Organic photoconductive materials comprising as an active ingredient a photoconductive copolymer consisting of 3 to 50 mole % of at least one acrylic monomer represented by the formula

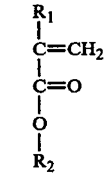

wherein $R_1$ is hydrogen or methyl; and $R_2$ is a group of the formula $-C_nH_{2n+1}$ or a group of the formula $-(CH_2)_m-X$ [wherein $n$ is an integer of 0 to 18; $m$ is an integer of 1 to 4; and X is a group of the formula $-OR_3$ or

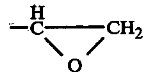

(wherein $R_3$ is a group of the formula $-C_lH_{2l+1}$; and $l$ is an integer of 0 to 4)], and 97 to 50 mole % of a photoconductive monomer having an $\alpha,\beta$-unsaturated bond.

9 Claims, No Drawings

ORGANIC PHOTOCONDUCTIVE MATERIALS

The present invention relates to organic photoconductive materials. More particularly, the invention pertains to high sensitivity organic photoconductive materials having excellent adhesive property and good film-forming property.

As materials having photoconductivity, there have heretofore been proposed inorganic materials such as selenium, cadmium sulfide, zinc oxide and titanium oxide as well as organic compounds such as anthracene, pyrene, perylene, imidazole, pyrazole, pyrazoline, polyvinylanthracene, poly-9-(p-vinylphenyl)anthracene, poly-N-vinylcarbazole, polyvinylacridine and poly-9-(p-vinylphenyl)acridine. Among these materials, part of photoconductive polymers and derivates thereof such as poly-9-(p-vinylphenyl)anthracene, poly-N-vinylcarbazole and poly-9-(p-vinylphenyl)acridine are practical in sensitivity.

Polymers or copolymers with another polymerizable vinyl monomer of 9-(p-vinylphenyl)anthracene or a brominated product thereof are disclosed in U.S. Pat. No. 3,764,590, British patent specification No. 1,316,387 and German patent specification No. 2,225,759, and polymers or copolymers with another polymerizable vinyl monomer of 9-(p-vinylphenyl)acridine are disclosed in U.S. patent application Ser. No. 580,316, now U.S. Pat. No. 4,037,036 and German patent application No. P 2,522,993.

Although these polymers and copolymers are good in transparency and film-forming property, their adhesive property for an electroconductive substrate or another photoconductive layer or an insulating polymer layer is practically poor and their flexibility is unsatisfactory. Therefore, long sized films can not be produced and the conditions for the production of films of a homogeneous surface are strictly limited. The reasons therefor are considered to be that many of the organic photoconductive polymers are vinyl polymers and have a bulky polycyclic aromatic or heterocyclic compound at their side chain. Particularly, if the molecular weight of photoconductive polymers is remarkably large or small, it is difficult to produce uniform and flexible films.

As a means for obviating such defects, there have been proposed the addition of a plasticizer, the use of a binder and the provision of an intermediate layer such as an adhesive layer. However, these means have detrimental influences upon photoconductive characteristics such as, for example, reduction in sensitivity, increase in residual electric charge or increase in dark decay.

The present invention has been made to obviate such defects, and an object of the invention is to provide organic photoconductive materials having high sensitivity, good adhesive property and excellent film-forming property.

According to the present invention, there is provided organic photoconductive materials comprising as an active ingredient a photoconductive copolymer consisting of 3 to 50 mole % of at least one acrylic monomer represented by the formula

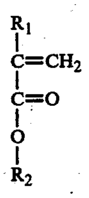

wherein $R_1$ is hydrogen or methyl; and $R_2$ is a group of the formula $-C_nH_{2n+1}$ or a group of the formula $-(CH_2)_m X$ [wherein $n$ is an integer of 0 to 18; $m$ is an integer of 1 to 4; and X is a group of the formula $-OR_3$ or

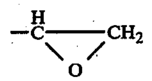

(wherein $R_3$ is a group of the formula $-C_lH_{2l+1}$; and $l$ is an integer of 0 to 4)], and 97 to 50 mole % of a photoconductive monomer having an $\alpha,\beta$-unsaturated bond.

Of the monomer constituting the copolymer in the present invention, said photoconductive monomer is exemplified by monomers constituting said known photoconductive polymers such as, for example, vinylanthracene, 9-(p-vinylphenyl)anthracene, N-vinylcarbazole, vinylacridine, 9-(p-vinylphenyl)acridine and derivatives thereof as well as the other photoconductive monomers having an $\alpha,\beta$-unsaturated bond (compounds having photoconductivity as a polymer). However, 9-(p-vinylphenyl)anthracene and 9-(p-vinylphenyl)acridine are particularly desirable in copolymerization reactivity with a monomer of said general formula. These photoconductive monomers and monomers of said general formula can have any composition (any mole % of each monomer in the copolymer). Also, these photoconductive monomers are characterized in that it is easy to produce films having excellent film-forming property since the viscosity of the copolymer can be increased. This is considered to be due to the fact that these photoconductive monomers have a styrene double bond.

Of the monomers constituting the copolymer in the present invention, the acrylic monomer of said general formula is exemplified by acrylic acid and methacrylic acid as well as alkyl esters, hydroxyalkyl esters ($l = 0$ in said general formula), alkoyalkyl esters and glycidylalkyl esters thereof. Here, the alkyl group may be either a straight chain alkyl group or a branched chain alkyl group.

In has been observed that these monomer components not only improve the film-forming property of the photoconductive copolymer but also remarkably improve the adhesive property of the copolymer for an electroconductive substrate or an insulating polymer layer constituting the photoconductive material.

Particularly, as a monomer improving filmforming property such as an increased viscosity and mechanical properties such as the flexibility of film, acrylic acid alkyl esters or methacrylic acid alkyl esters are used, and adhesive property is somewhat improved by them. As examples thereof there may be enumerated methyl, ethyl, propyl, butyl, isobutyl, octyl, lauryl and stearyl esters of acrylic acid and methacrylic acid. Of these acrylic acid and methacrylic acid alkyl esters, alkyl esters of said general formula wherein *n* is 4 to 18 are effective for an improvement in viscosity and flexibility.

Also, the acrylic monomers improving adhesive property particularly remarkably are acrylic acid and methacrylic acid as well as hydroxyalkyl esters, alkoxyalkyl esters and glycidylalkyl esters thereof. It goes without saying that these monomers also improve film-forming property. Examples thereof include acrylic acid and methacrylic acid as well as glycidyl ester, hydroxyethyl ester, hydroxypropyl ester, hydroxybutyl ester, ethoxyethyl ester and butoxyethyl ester thereof.

The monomer composition of the copolymer in the present invention must be 3 to 50 mole % of an acrylic monomer and 97 to 50 mole % of a photoconductive monomer, and preferably 5 to 40 mole % of the former and 95 to 60 mole % of the latter. If the amount of the acrylic monomer exceeds 50 mole %, the sensitivity as a photoconductive copolymer is reduced and the resulting copolymer is unpractical. Also, if the amount of the acrylic monomer is less than 3 mole %, the effect of improving viscosity increase and the flexibility and adhesive property of films is small. When alkyl esters of acrylic acid or methacrylic acid are used for the above-mentioned object, the preferable amount of the esters is 10 to 40 mole %. Further, the amount of an acrylic monomer used for the purpose of improving adhesive property is 5 to 30 mole %. It is possible to mix these two monomers and then copolymerize the mixture with a photoconductive monomer.

The copolymers in the present invention include block copolymers and graft copolymers. The polymerization may be carried out according to general radical polymerization processes. For example, a process as described in U.S. Pat. No. 3,764,590, British patent specification No. 1,316,387 and German patent specification No. 2,225,759 may be used.

The copolymers thus obtained are found to have a very high viscosity and excellent transparency as film as compared with a homopolymer of the photoconductive monomer.

When a homopolymer of an acrylic monomer is blended with a homopolymer of a photoconductive monomer, there is a problem with regard to compatibility. Any one of these polymers is not dissolved in a solvent or even if both the polymers are dissolved, the film produced from the blend becomes white turbid when dried. Thereby, the transparency of the film becomes poor and its film-forming property is not good.

In the photoconductive materials of the present invention, various sensitizers may be used together with the above-mentioned photoconductive copolymer as an active ingredient in order to increase the sensitivity of the materials. Such sensitizers include not only spectrum sensitizers such as dyes but also chemical sensitizers which are Lewis acids such as 2,4,7-trinitrofluorenone, 2,4,5,7-tetranitrofluorenone, 2,4,5,7-tetranitrocarbazole, tetracyanoquinodimethane, tetracyanoethylene, tetrachlorophthalic anhydride, tetrabromophthalic anhydride, chloranil and bromanil. The amount of these sensitizers added is preferably 0.1 to 10 % by weight based on the weight of the photoconductive copolymer in the case of spectrum sensitizers. If the amount added exceeds 10 % by weight, the sensitizers and the copolymer often become uncompatible and the electric discharge rupture of the film is easy to occur. On the other hand, chemical sensitizers may be added in an amount of 1 to 100 mole % based on the photoconductive monomer in the copolymer according to object. If transparency is required, however, the amount added is preferably up to 20 mole %. Also, if sensitivity is regarded as important, the amount added is preferably more than 20 mole %.

Further, in the photoconductive materials of the present invention, a plasticizer and/or a reinforcing agent (binder) such as, for example, polyphenyls, chlorinated polyphenyls, polyesters, polycarbonates, xylene resins and phthalic acid alkyl esters may be blended with the copolymer without departing from the objects of the present invention.

The photoconductive materials of the present invention may be dissolved in an organic solvent and the resulting solution may be then applied onto an electroconductive substrate to yield an excellent photoconductive film.

However, the photoconductive materials of the present invention are not limited to such a use as a film. As the electroconductive substrate, paper, plastics and films which have been subjected to electroconductive treatment as well as metal plates such as plates of aluminum and copper may be used, but the substrate is not limited to these materials.

The following examples illustrate the present invention, but the present invention is never limited to these examples.

EXAMPLE 1

0.56 Gram of isobutyl methacrylate, 5.6 g of 9-(p-vinylphenyl)anthracene, 15.6 mg of di-tert.-butylperoxide (as a polymerization initiator) and 8 ml of xylene were heated in a nitrogen gas stream at 130° C for 8 hours. The resulting polymer was precipitated with methanol. The precipitate was filtered and dried under vacuum. The product was then purified twice with dichloroethane-methanol according to reprecipitation method and dried. Thus, a copolymer was obtained in the form of yellow powder. Yield about 100 %. The isobutyl methacrylate component in the copolymer was calculated from elementary analysis values to amount to 21.2 mole %. In its infrared absorption spectrum, the characteristic absorption of the ester at 1720 $cm^{-1}$ was observed and it showed that the ester was copolymerized.

The reduced viscosity of the copolymer was 24.2, which was larger than the reduced viscosity of poly-9-(p-vinylphenyl)anthracene homopolymer obtained under the same polymerization conditions of 6.6. In order to evaluate the film-forming property of these two polymers, the polymers were respectively coated onto a polyethylene terephthalate film ("Hi-Beam TL100" manufactured by Toray Industries, Inc.), which had an electronconductive layer, as a dichloroethanexylene (1:1) solution having a solid content of 30% by weight so that the thickness of the resulting coating film might be 10$\mu$. When the coating film was dried, the homopolymer showed a non-uniform film surface at a drying temperature of 40° to 100° C while the copolymer gave a film of a uniform surface even at the said drying temperature.

EXAMPLE 2

1.5 Grams of the copolymer obtained in Example 1, 64 mg of 2,4,5,7-tetranitrofluorenone and 0.4 g of m-terphenyl as a plasticizer were dissolved in a mixture of dichloroethane-xylene (1:1). The resulting solution was heated under reflux for 4 hours, and a film was prepared in the same manner as in Example 1. The drying temperature was 60° C. The transmission density of the resulting film as measured by a densitometer of Macbeth Co. was 0.04 and the film was found to have very good transparency. The film was electrified by a corona voltage of +6 kV and irradiated with a light to measure its photosensitivity. Its half-decay exposure ($E_{50}$), which is the total exposure required to decrease the charge on the film surface to one-half of the initial value, was 216 lux. second. When a film was prepared from the above-mentioned homopolymer in the same manner and the $E_{50}$ value of the film was measured, the $E_{50}$ value was 249 lux.sec. Thus, no reduction in sensitivity was observed in the copolymer of the present invention, but the copolymer showed a slightly better value.

EXAMPLE 3

5 Grams of 9-(p-vinylphenyl)acridine, 0.4 g of butyl acrylate, 0.1 g of glycidyl methacrylate, 26 mg of 1,1'-azobis-1-cyclohexanecarbonitrile as a polymerization initiator and 50 ml of xylene were mixed. The mixture was reacted at 80° C for 4 hours and then at 130° C for 10 hours in a nitrogen gas stream. The resulting copolymer (molecular weight 58,000) was purified in the same manner as in Example 1. Yield 76.5 %. The absorption of an ester group was observed at 1720 $cm^{-1}$ in its infrared absorption spectrum and it was confirmed that copolymerization had been effected. The polymer thus obtained was dissolved in dioxane-tetrahydrofuran (1:1) so that the solid content might be 10 % by weight. The solution was flow-coated onto an aluminum plate of 0.2 mm in thickness. When the resulting film was subjected to a 180° peel test with a cellophane tape, no peel was observed and the film showed good adhesive property. When a film was prepared from the homopolymer of 9-(p-vinylphenyl)acridine in the same manner and the film was subjected to a peel test, peel partly occurred.

EXAMPLE 4

To 1 g of the polymer obtained in Example 3 were added 1 g of 2,4,7-trinitrofluorenone and 0.3 g of m-terphenyl as a plasticizer. The mixture was dissolved in 30 ml of tetrahydrofuran-dioxane (1:1). The solution was flow-coated onto an aluminum plate in the same manner as in Example 3 to prepare a film of 10μ in thickness. The film was electrified by a corona voltage of −6 kV and irradiated with a light to measure its photosensitivity. The $E_{50}$ value of 6.5 lux.sec showed a high photosensitivity. This photosensitivity is almost equal to the $E_{50}$ value of the homopolymer of 9-(p-vinylphenyl)acridine of 5 lux.sec. Substantially no reduction in sensitivity due to copolymerization was observed.

EXAMPLE 5

The same polymerization procedure, film-forming and test as in Example 3 were repeated except the photoconductive monomer and the acrylic monomer were varied. In this example, the copolymers of the compositions as shown in Table 1 were prepared.

Table 1

| Sample No. | Composition of copolymer: 9-(p-vinylphenyl)-anthracene (mole %) | Acrylic monomer (mole %) | | Cellophane tape peel test of copolymer film |
|---|---|---|---|---|
| 1 | 95 | 2-Ethylhexyl methacrylate | 5 | o |
| 2 | 80 | Stearyl methacrylate | 10 | o |
| | | Glycidyl methacrylate | 10 | |
| 3 | 60 | Butyl acrylate | 40 | o |
| 4 | 60 | Butoxyethyl methacrylate | 40 | o |
| 5 | 98 | " | Ca. 2 | x |
| 6 | 100 | — | | x |

Notes:
o: Not peeled
x: Peeled

Sample Nos. 1 to 4 are the examples of the present invention while Sample Nos. 5 and 6 are comparative examples. As is clear from this table, good adhesive property can be obtained when at least 3 mole %, and preferably at least 5 mole %, of the acrylic monomer is copolymerized.

EXAMPLE 6

Copolymers were prepared from 95 mole % of 9-(p-vinylphenyl)anthracene as a photoconductive monomer and 5 mole % of the acrylic monomers as described in Table 2 in the same manner as in Example 1. Also, various sensitizers were added, and films were prepared. The films thus obtained were compared with a film prepared from homopolymer of 9-(p-vinylphenyl-)anthracene. The results are shown in Table 2. The copolymers were found to be similar or superior to the homopolymer in electric charge characteristics such as original charged potential and half-decay exposure and to improve the adhesive strength of the films as compared with the homopolymer.

Table 2

| Sample No. | Composition of copolymer: 9-(p-Vinyl-phenyl)-anthracene (mole %) | Acrylic monomer (mole %) | Acrylic*1 component in copolymer (mole %) | Chemical sensitizer | Electric charge*2 characteristics of copolymer-sensitizer System film: Original charged potential (V) | Half-decay exposure (lux . sec.) | Cello-*3 phane tape peel test of copolymer film |
|---|---|---|---|---|---|---|---|
| 7 | | | | Bromanil | 1080 | 125 | o |
| 8 | 95 | Acrylic acid 5 | ca. 4.5 | 2,4,5,7-Tetranitrocarbazole | 1020 | 120 | o |
| 9 | | | | Tetracyanoquinodimethane | 800 | 30 | o |
| 10 | | | | 2,4,7-Trinitrofluorenone | 1150 | 9 | o |
| 11 | | | | Bromanil | 1000 | 130 | o |
| 12 | 95 | Hydroxybutyl methacrylate 5 | ca. 5 | 2,4,5,7-Tetranitrocarbazole | 1050 | 130 | o |
| 13 | | | | Tetracyanoquinodimethane | 820 | 35 | o |
| 14 | | | | 2,4,7-Trinitrofluorenone | 1020 | 11 | o |
| 15 | | | | Bromanil | 970 | 130 | x |
| 16 | | | | 2,4,5,7-tetranitro- | 980 | 125 | x |

Table 2-continued

| Sample No. | Composition of copolymer: 9-(p-Vinylphenyl)-anthracene (mole %) | Composition of copolymer: Acrylic monomer (mole %) | Acrylic[*1] component in copolymer (mole %) | Chemical sensitizer | Electric charge[*2] characteristics of copolymer-sensitizer System film: Original charged potential (V) | Electric charge[*2] characteristics of copolymer-sensitizer System film: Half-decay exposure (lux . sec.) | Cello-[*3] phane tape peel test of copolymer film |
|---|---|---|---|---|---|---|---|
| | 100 | — | — | carbazole | | | |
| 17 | | | | Tetracyanoquinodimethane | 770 | 30 | x |
| 18 | | | | 2,4,7-Trinitrofluorenone | 1050 | 10 | Δ |

*1 Calculated from elementary analysis values and infrared absorption spectra.
*2 Film composition (mole %): copolymer: chemical sensitizer: m-terphenyl = 0.6 : 0.3 : 0.1.
*3 o : Not peeled
x : Peeled
Δ : Partly peeled

EXAMPLE 7

1.5 Grams of the copolymer obtained in Example 1, 15 mg of Nile Blue and 0.4 g of m-terphenyl were dissolved in dichloroethane. The solution was heated at 40° C for 2 hours with stirring. A film was prepared in the same manner as in Example 1. The transmission density of the resulting blue film was 0.038 and it was found that the film had very good transparency. Also, its half-decay exposure ($E_{50}$) was 250 lux.sec. When a microfilm image was prepared by the use of a usual electrophotographic method, a distinct image of a contrast ratio of about 2.0 was obtained.

What is claimed is:

1. A photoconductive material comprising as an active ingredient a photoconductive copolymer consisting of 3 to 50 mole % of at least one acrylic monomer represented by the formula

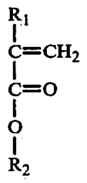

wherein $R_1$ is hydrogen or methyl; and $R_2$ is a group of the formula $—C_nH_{2n+1}$ or a group of the formula $-(CH_2)_m X$, wherein *n* is an integer of 0 to 18; *m* is an integer of 1 to 4; and X is a group of the formula $—OR_3$ or

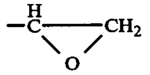

(wherein $R_3$ is a group of the formula $—C_lH_{2l+1}$; and *l* is an integer of 0 to 4), and 97 to 50 mole % of a photoconductive monomer having an α,β-unsaturated bond selected from the group consisting of [vinylanthracene,] 9-(p-vinylphenyl)anthracene[, N-vinylcarbazole, vinylacridine] and 9-(p-vinylphenyl)acridine.

2. A photoconductive material according to claim 1, wherein said photoconductive monomer is 9-(p-vinylphenyl)anthracene.

3. A photoconductive material according to claim 1, wherein said photoconductive monomer is 9-(p-vinylphenyl)acridine.

4. A photoconductive material according to claim 2, wherein said photoconductive copolymer consists of 5 to 40 mole % of at least one of said acrylic monomers and 95 to 60 mole % of 9-(p-vinylphenyl)anthracene.

5. A photoconductive material according to claim 3, wherein said photoconductive copolymer consists of 5 to 40 mole % of at least one of said acrylic monomers and 95 to 60 mole % of 9-(p-vinylphenyl)acridine.

6. A photoconductive material according to claim 1, wherein $R_2$ is a group of the formula $—C_nH_{2n+1}$ wherein *n* is an integer of 4 to 18.

7. A photoconductive material according to claim 6, wherein said acrylic monomer is present in an amount of 10 to 40 mole %.

8. A photoconductive material according to claim 1, wherein $R_2$ is a group of the formula $—C_nH_{2n+1}$ wherein *n* is 0 or a group of the formula $-(CH_2)_m X$, wherein *m* is an integer of 1 to 4, X is a group of the formula

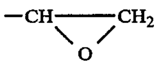

or $—OR_3$ wherein $R_3$ is a group of the formula $—C_lH_{2l+1}$ and *l* is an integer of 0 to 4.

9. A photoconductive material according to claim 8, wherein said acrylic monomer is present in an amount of 5 to 30 mole %.

* * * * *